United States Patent [19]

Cross et al.

[11] Patent Number: 5,383,951
[45] Date of Patent: Jan. 24, 1995

[54] PRODUCTION OF GRANULAR AMMONIUM SULPHATE USING STRIPPED ZINC ELECTROLYTE AS A GRANULATING AID

[75] Inventors: James B. Cross, Trail; Kenneth L. Beynon, Castlegar; Cashman R. S. M. Hampton, Rossland, all of Canada

[73] Assignee: Cominco Ltd., Vancouver, Canada

[21] Appl. No.: 112,277

[22] Filed: Aug. 27, 1993

[51] Int. Cl.⁶ ............................................. C05C 3/00
[52] U.S. Cl. ................................... 71/61; 71/63; 71/64.07; 71/64.11; 71/64.12; 71/64.13; 23/302 A
[58] Field of Search .............. 71/1, 51, 53, 61, 63, 71/64.07, 64.11, 64.12, 64.13; 23/302 A; 204/13

[56] References Cited

U.S. PATENT DOCUMENTS

| | | | |
|---|---|---|---|
| 2,043,066 | 6/1936 | Rumscheidt et al. | 23/119 |
| 2,043,067 | 6/1936 | Rumscheidt et al. | 23/119 |
| 2,043,068 | 6/1936 | Rumscheidt et al. | 23/119 |
| 2,092,073 | 9/1937 | Jeltsch et al. | 23/119 |
| 2,782,097 | 2/1957 | Costolow | 23/119 |
| 3,351,455 | 11/1967 | Burns | 71/61 |
| 4,589,904 | 5/1986 | Harrison et al. | 71/61 |
| 5,043,007 | 8/1991 | Davis | 71/80 |
| 5,264,017 | 11/1993 | Van de Walle | 71/61 |

FOREIGN PATENT DOCUMENTS

| | | |
|---|---|---|
| 492758 | 9/1975 | Australia . |
| WO89/04291 | 10/1988 | Australia . |
| 627438 | 10/1988 | Australia . |
| 648539 | 8/1937 | Germany . |
| 671784 | 2/1939 | Germany . |
| 877297 | 5/1953 | Germany . |
| 52-006645 | 1/1977 | Japan . |
| 1515898 | 10/1975 | United Kingdom . |

OTHER PUBLICATIONS

Hollingsworth et al. "Australian Experience . . . Pipe Reactor" Nitrogen 1986, British Sulfur Corp., Ltd.
Aron, 1989, "Improved Incitec . . . criteria"; Nitrogen 177, Jan.–Feb. 89, pp. 21–24.
Fertilizer Manual, U.N. Industrial Devel. Org., N.Y., 1967, pp. 168–169.
Anon, Esso, "First in the Field with Granular Ammonium Sulphate"; Engro–undated.

*Primary Examiner*—Ferris Lander
*Attorney, Agent, or Firm*—Arne I. Fors

[57] ABSTRACT

A process is disclosed for the production of free-flowing, non-caking, stable granular ammonium sulphate containing micronutrients comprising granulating ammonium sulphate in the presence of a granulating aid which is stripped zinc electrolyte derived from an electrolytic zinc operation. An effective amount of stripped zinc electrolyte is used to yield a final ammonium sulphate product containing about 0.4% to 1.3% by weight zinc, up to about 0.16% by weight magnesium and up to about 0.09% by weight manganese. The stripped zinc electrolyte, typically containing 20–25 g/L zinc, 2–4 g/L magnesium, 1–2 g/L manganese and sulphuric acid, may be added during reaction of ammonia and sulphuric acid prior to granulation. A free-flowing, non-caking, hard, ammonium sulphate granular fertilizer having a pH of about 2 to 7.5 as 10% solution, containing by weight 0.4% to 1.3% by weight zinc, up to about 0.16% by weight magnesium and up to about 0.09% by weight manganese is produced.

8 Claims, No Drawings

PRODUCTION OF GRANULAR AMMONIUM SULPHATE USING STRIPPED ZINC ELECTROLYTE AS A GRANULATING AID

This invention relates to a process for the production of fertilizer and more particularly relates to a process for the production of granular ammonium sulphate.

BACKGROUND OF THE INVENTION

Ammonium sulphate is commonly produced as a crystalline product by continuous evaporative crystallization. The most common use for this product is as an agricultural fertilizer. It is commercially important that ammonium sulphate be blendable with other fertilizers since this is desirable in many application operations. However, the physical properties of typical ammonium sulphate crystals makes such a product unsuitable for blending due to poor sizing characteristics. Accordingly, a considerable amount of ammonium sulphate currently is produced as a screened crystal for use as a fertilizer in unblended form.

The production of ammonium sulphate granules, having characteristics (e.g. size) comparable to other conventional fertilizers, is highly desirable from a marketing point of view, because of the blending capability. In addition to proper sizing, such granules must be free-flowing, non-caking and stable. They must be sufficiently hard, i.e. non-friable, to overcome crumbling during storage and distribution, and must not be susceptible to ambient moisture absorption.

Various attempts have been made to overcome problems inherently associated with the production of crystalline ammonium sulphate by improving crystallization and nodulization processes, and by developing surface coating and granulation processes.

Processes for the production of ammonium sulphate, using various reactors such as pipe reactors, are described in the literature. The use of various rotary granulators, the crushing of oversize material, the recycling of fines and the addition of elements as a source of micronutrients, are known.

Rumscheidt et al., U.S. Pat. Nos. 2,043,066, 2,043,067 and 2,043,068 (June, 1936), describe the production of coarsely crystalline ammonium sulphate by adding water soluble salts to an aqueous solution of ammonium sulphate and evaporating the solution. Combinations of water soluble salts include those containing aluminum/manganese, aluminum/zinc and aluminum with one of sodium, potassium or magnesium.

The production of non-caking ammonium sulphate in the form of flat, scale-like crystals by adding aluminum sulphate to ammonium sulphate and maintaining a solution pH of 5.8–7.0 is disclosed in U.S. Pat. No. 2,092,073 by Jeltsch (September 1937).

Costolow U.S. Pat. No. 2,782,097 (February 1957) discloses a method for improving the production of ammonium sulphate crystals in a continuous evaporative crystallization process by extending the metastable region suitable for such crystallization in the presence of soluble trivalent ions of chromium, iron and aluminum.

U.S. Pat. No. 3,351,455 to Burns (November 1967) describes a method of making granular ammonium sulphate fertilizer by contacting a recirculating stream of granulation nuclei, comprising undersize particles of said product, with a sulphuric acid and ammonia reaction product. The product from the granulation zone has a bulk pH of less than 2.5. Attempts at raising the pH above 2.5 resulted in the production of an excessive amount of fines and dust with operational problems due to the equipment filling with dust.

U.S. Pat. No. 4,589,904 to Harrison et al. (May, 1986) details a process for granulating crystalline by-product ammonium sulphate using an ammonium sulphate/sulphuric acid/alum solution and gaseous anhydrous ammonia. The freshly precipitated ammonium sulphate produced binds the crystals together.

According to Japanese Patent 52006645, issued in 1977, a sulphate of a cation of a minor nutrient can be calcined with ammonium sulphate to give an anhydrous salt which is compounded with powdery or granular fertilizers. A sulphate of zinc can be such a material. This addition maintains good fertilizer flow properties during storage.

According to a process for the commercial production of granular ammonium sulphate using a basic process described in Australian Patent 492,758, feed materials, including sulphuric acid and ammonia, are reacted in the presence of appropriate amounts of an aluminum salt granulating aid. The reaction product is discharged onto a bed of recycled fines in a rotary granulator. The granulated material is screened with on-size material being the product. Oversize material is crushed and recycled along with undersize fines to the granulation step. More particularly, ammonium sulphate is granulated in the presence of a granulation aid which is an aluminum or ferric salt to produce a granulation product with a pH of 4.0 to 4.5.

PCT Patent Application WO89/04291, published May 18, 1989, describes a method for producing free-flowing, non-caking granular ammonium sulphate having a pH between 2.5 and 4.0 in the presence of a granulating aid selected from the group consisting of a metal salt, a metal oxide, and a salt of a metal hydroxide. The metal salt is selected from the group consisting of aluminum and ferric salts, as in Australian Patent 492,758, and preferably is aluminum salt. The process described differs from the basic process in the original Australian patent in that the granulation is conducted at a pH range of 2.5 to 4.0 which previously was considered unusable.

In U.S. Pat. No. 5,043,007 to Davis, (August 1991), a process is disclosed for coating fertilizer particles, such as ammonium sulphate, with a mixture of nutrients and metallic salts, such as hydrated zinc sulphate.

In the production of zinc, by the electrolytic process, a bleed of a portion of zinc electrolyte is necessary in the control of the process. This is a requirement of all such similar operations worldwide and is needed to remove excess water (solution bulk) and sulphate, as well as deleterious elements, mainly magnesium and halides, which are detrimental to the electrolytic zinc process and which are not removed in the normal electrolyte purification process.

Various methods are practised in the handling and processing of this purge. One such processing scheme is electrolysis of the bleed stream in order to strip the solution of its zinc content, although a significant soluble zinc content remains in the stripped zinc electrolyte. The stripped solution also contains sulphuric acid and dissolved manganese. The stripped solution may then be neutralized. Table 1 shows a typical chemical analysis of the stripped zinc electrolyte in an electrolytic plant.

TABLE 1

TYPICAL COMPOSITION OF STRIPPED ZINC ELECTROLYTE

| | |
|---|---|
| zinc | 20-25 g/L |
| magnesium | 2-4 g/L |
| manganese | 1-2 g/L |
| sulphuric acid | 190-200 g/L |
| total sulphate | 250 g/L |
| calcium | 400 mg/L |

It has now been surprisingly found that such stripped zinc electrolyte can be used as an effective granulating aid in the production of granular ammonium sulphate fertilizer, eliminating the use of conventional granulating aids, while providing valuable micronutrients to the fertilizer.

SUMMARY OF THE INVENTION

In accordance with the present invention, a method is provided for the production of granulated ammonium sulphate in which stripped zinc electrolyte is used as a granulating aid, in contrast to the basic Australian process in which an aluminum or ferric salt is used. A product is formed which is free-flowing, non-caking, stable, hard and appropriately sized, thus meeting the criteria for a marketable, blendable fertilizer.

The stripped zinc electrolyte contains zinc, magnesium, manganese and other elements in a sulphate solution. The source of this granulating aid and micronutrients is an electrolytic zinc operation which may be directly linked to an ammonium sulphate production facility. Such a solution is typically available as a by-product of an electrolytic zinc operation and, if used as a granulating aid, requires no further treatment or neutralization. Other known granulating aids must be purchased and are typically not a source of zinc, magnesium and manganese micronutrients.

The basic process, wherein the present invention is used, is known as typified, for example, in U.S. Pat. No. 3,351,455 and Australian Patent 492,758 discussed above, incorporated herein by reference. In accordance with the ammonium sulphate granulation process, ammonia and sulphuric acid in an aqueous stream are reacted and the reaction slurry product is deposited such as by spraying onto the surface of a rolling granule bed of ammonium sulphate nuclei in a drum granulator, which has an ammonia sparger positioned within the rolling granule bed. Recycle fines are continuously added to the drum granulator. The granulator product is dried in a rotary dryer and then screened.

In its broad aspect, the process of the invention for the production of free-flowing, non-caking, stable granular ammonium sulphate containing micronutrients comprises granulating ammonium sulphate in the presence of a granulating aid which is stripped zinc electrolyte derived from an electrolytic zinc operation. An effective amount of stripped zinc electrolyte is provided to yield a final ammonium sulphate product containing about 0.4% to 1.3% by weight zinc.

The stripped zinc electrolyte typically contains 20-25 g/L zinc, 2-4 g/L magnesium, 1-2 g/L manganese and sulphuric acid, as indicated in Table 1. However, it will be understood that this composition is typical of a particular plant and may vary with the electrolytic processes used in other plants within the range of 10 to 30 g/L zinc, up to 10 g/L magnesium and up to 10 g/L manganese. The ammonium sulphate is a reaction product of ammonia and sulphuric acid and the stripped zinc electrolyte granulating aid usually is added during reaction of the ammonia and sulphuric acid. Preferably, the stripped zinc electrolyte containing zinc, magnesium and manganese is added as a granulating aid in an amount effective to produce a final ammonium sulphate product containing up to about 1.3% by weight zinc, about 0.01% to 0.16% by weight magnesium and 0.01% to 0.09% by weight manganese. More preferably, the final ammonium sulphate product contains about 0.4% to 1.3% by weight zinc, and typically about 0.07% to 0.16% by weight magnesium and about 0.04% to 0.09% by weight manganese. A free-flowing, non-caking, hard ammonium sulphate granular fertilizer having a pH of about 2 to 7.5 as 10% solution containing by weight 0.4% to 1.3% by weight zinc, up to about 0.16% by weight magnesium and up to about 0.09% by weight manganese which, in a specific and suitable embodiment having a pH in the range of about 2 to 7.5 as a 10% solution, contains by weight about 0.7% by weight zinc, about 0.09% by weight magnesium and about 0.05% by weight manganese.

DESCRIPTION OF THE PREFERRED EMBODIMENT

In the preferred embodiment of the process of this invention, granular ammonium sulphate is produced in a pipe reactor in which sulphuric acid, ammonia and an aqueous stream are reacted in the presence of stripped zinc electrolyte, followed by granulation, drying, screening and recycling of fines and crushed oversize. The operation is conducted under typically known conditions, such as disclosed in Australian Patent 492,758, except for addition of the stripped zinc electrolyte, which replaces known granulating aids such as aluminum or iron salts.

Stripped zinc electrolyte is added in an effective amount to give a final ammonium sulphate product typically containing from about 0.4% to 1.3% by weight zinc with a typical preferred average of about 0.7% by weight zinc. The beneficial effect of the stripped zinc electrolyte may take effect at a level which would yield zinc in the product below 0.4% by weight in zinc and in actual practise, periods of operation yielding below 0.4% zinc down to 0.1% by weight zinc in the product could be temporarily experienced. However, the normal operating range of stripped zinc electrolyte addition is preferred to yield from about 0.4% to 1.3% by weight zinc in the product.

Other micronutrient levels in the ammonium sulphate product can range by weight from about 0.01% to 0.16% magnesium, typically 0.07% to 0.16% magnesium, and often 0.09% magnesium, and from about 0.01% to 0.09% manganese, typically 0.04% to 0.09% manganese and often 0.05% manganese.

The addition of stripped zinc electrolyte increases the proportion of appropriately sized product granules, in the range from −6 to +9 Tyler mesh, for use as a spreadable and blendable commercial fertilizer.

The addition of stripped zinc electrolyte gives product granules of required hardness for use as a commercial fertilizer. The typical hardness range for a full scale plant product is 4.5-6 kg, measured as will be described below with reference to the examples.

The addition of stripped zinc electrolyte gives granules which are free-flowing and non-caking. The use of stripped zinc electrolyte as a granulating aid permits the operation of the granulation process without excessive dusting conditions and with an acceptable level of fines recycle.

The following examples serve to illustrate the utility of the present invention. The examples are intended to provide better understanding to those skilled in the art and are not intended to limit the scope or range in which the invention may be applied.

The effect of the granulating aid of the invention for ammonium sulphate is herein measured by its ability to promote granule growth, inhibit dust formation during granulation, to make possible the production of granules having a pH above pH 2.5 with a wide range of from 2.0 to 7.5, and to provide valuable micronutrients in the final product. All measurements of the micronutrients zinc, magnesium and manganese in the examples are represented as percentages by weight.

Except for the last example (Example 11) all tests were carried out on a pilot plant scale, in which the process was carried out continuously, complete with recycles. The last test represent results from full scale plant tests, for which plant modifications were undertaken specifically for test purposes in order to demonstrate the viability of the present invention on an industrial scale.

In the pilot plant tests, the process employed the reaction of ammonia and sulphuric acid in an aqueous stream in a pipe reactor. The reaction mixture from the pipe reactor was sprayed onto the surface of a rolling granule bed in a drum granulator, which had an ammonia gas sparger positioned within the rolling granule bed. Additional heat to maintain the bed temperature in the drum granulator was supplied by gas-fired burners applied to the outside of the drum. Recycle fines ($-9$ Tyler mesh) were continuously added to the drum granulator. The granulator product was dried in a rotary gas-fired dryer and then screened. Stripped zinc electrolyte was added as a granulating aid to the aqueous stream fed to the pipe reactor.

For the full scale plant test, the process was essentially the same as that used in the pilot plant tests except that no additional heat was required on the outside of the granulator drum.

Comparative tests were carried out on a pilot plant scale in order to demonstrate the relative effect of the granulating aids and to determine key parameters for the full scale plant test. Pilot plant tests were carried out with no granulating aid (water addition only), a known granulating aid (aluminum), stripped zinc electrolyte, and various metal salts.

For the pilot plant test examples, a relative "growth rate index" is defined which allows comparisons of granulating effectiveness to be made. The growth rate index is defined as the average increase in mean size of the granules as they pass through the drum granulator divided by the average granulator retention time. Mean size of samples of recycle fines and granules discharged from the granulator/dryer circuit were obtained by interpolation using plots of the screen analysis data on arithmetic probability paper and logarithmic probability paper, respectively. The growth rate index is calculated using size data for the feed and discharge granules but does not take into account the amount of dust formation.

The percentage of material that is discharged from the pipe reactor and converts to ventilation dust was determined by calculation (mass balance difference). This is an indicator of undesirable dusting and fines production in the granulation process. The percentage of product from the pipe reactor going to ventilation dust is defined as the "dusting index". "Pipe reactor make" is defined as the amount or rate of ammonium sulphate sprayed from the pipe reactor.

The pH values were obtained for 10% (w/w) solutions of the ammonium sulphate granules.

Granule hardness data are reported for granules just sticking in a Tyler 7 mesh screen so that the granules are just slightly greater than 7 mesh in size. Two or more samples of 25 granules each were tested and averages taken. The hardness values were measured with an automated Chatilion TM hardness tester (model TCD200, fitted with a DFGS50 force gauge). Hardness values are reported without reference to pH because there was no observed pH dependence.

Accelerated caking tests were carried out by placing samples in a two-inch diameter tube under 35 psig pressure at 30° C., and at a humidity less than the critical relative humidity for the material. Tests were done after the samples had been stored at ambient temperature for at least a few days after the formation of the granules.

Critical relative humidities (CRH) were measured as described in the "Manual for Determining the Physical Properties of Fertilizers", by David Rutland of the International Fertilizer Development Centre (IFDC 1986). Air at a controlled humidity was passed over samples in a thermostated glass chamber for three hours and weight changes monitored hourly. The manual defines CRH as "that humidity of the atmosphere above which a material will absorb a significant amount of moisture and below which it will not". The manual acknowledges that CRH is not precisely defined for impure substances and leaves somewhat open the question of what is a "significant amount of moisture". Hydrated solid phases are possible with the metal salts used in the following examples. The metal salts caused minor water absorption at low relative humidities but, in keeping with the manual, absorption of less than approximately 0.4% by weight of water, in the three hour test, was taken as not a significant amount.

In the following pilot plant examples, it was observed that granulating aids enhance granulation, as measured by the growth rate index. It was also observed that, without a suitable granulating aid, attempts at producing granules with a higher pH were unsuccessful due to production of very fine material of higher pH while the pH of the $+9$ mesh granules stayed low. This is consistent with the experience of Burns (U.S. Pat. No. 3,351,455) wherein the ammonium sulphate equipment filled with dust when the operators tried to raise the pH above 2.5. It is known from the tests that granulation without excessive dust formation (dusting index $<10\%$) is possible when using stripped zinc electrolyte as a granulating aid. Also, acceptable control of solids recycles was experienced in the plant tests using stripped zinc electrolyte, with favourable recycle ratios, as illustrated in the following examples.

Example 1

This example used the known additive aluminum salt at a concentration as specified in the prior art to yield a product having a 0.2% Al in order to establish a base for comparison purposes. The data are shown in Table 2.

TABLE 2

| Operating Data | |
|---|---|
| Total water input as percentage of granulation feed (%) | 21 |
| Average granulator temperature (°C.) | 85 |

TABLE 2-continued

| | |
|---|---|
| Average granulator retention time (h) | 0.9 |
| Results | |
| Average moisture in (−6 to +9 mesh) granulator discharge (%) | 2.0 |
| Growth rate index (mm/h): | 0.14 +/− 0.04 |
| % of pipe reactor make to ventilation as dust (i.e. dusting index) (%) | 0-5 |
| Product pH: | 3.0-4.7 |
| Average product hardness (kg) | 4.1 +/− 0.5 |
| Accelerated caking test (for pH 3.0 sample): | no caking |
| Critical relative humidity (CRH) at 30° C. (%) | 85-95 |

Granulation with aluminum as a granulating aid was readily accomplished. These results provide a base for comparative purposes with the following pilot plant examples.

Example 2

This example is included to demonstrate the need for a granulating aid. Granulation was attempted with the addition of water only. Table 3 summarizes the results.

TABLE 3

| | |
|---|---|
| Operating Data | |
| Total water input as percent of granulator feed (%) | 16 |
| Average granulator temperature (°C.) | 88 |
| Average granulator retention time (h) | 1.0 |
| Results | |
| Average moisture (−6 to +9 mesh) in granulator discharge (%) | 1.0 |
| Growth rate index (mm/h) | −0.02 +/− 0.03 |
| % of pipe reactor make to ventilation as dust (%) | 32 +/− 5 |
| Product pH | 1.7-2.5 |
| Average product hardness (kg) | 3.2 +/− 0.5 |
| Accelerated caking test (for pH 3.0 sample): caking occurred with lumps readily broken under finger pressure | |
| Critical relative humidity of 30° C. (%) | 75-85 |

Although some granules could be made at the required product sizing (−6 to +9 mesh) with hardness comparable to the aluminum case in Example 1, the growth rate index was virtually zero, indicating poor or insufficient granulation with less on-size material and the tendency to produce more fines in the granulator as compared to the aluminum case. Attempts to form granules with a pH above 2.5 by increasing water input were unsuccessful and resulted mainly in the production of very fine material with higher pH, while the pH of the +10 mesh granules stayed below 2.5. As seen in the data, the percentage of pipe reactor make reporting to the ventilation system as dust was excessive even below pH 2.5. This would be unacceptable on an industrial scale.

Example 3

This example is to illustrate the use of stripped zinc electrolyte as a granulating aid at an average level of addition to produce a product having 0.7% Zn, 0.09% Mg and 0.05% Mn. Table 4 summarizes the results.

TABLE 4

| | |
|---|---|
| Operating Data | |
| Total water input as percent of granulator feed (%) | 17 |
| Average granulator temperature (°C.) | 85 |
| Average granulator retention time (h) | 0.9 |
| Results | |
| Average moisture in (−6 to +9 mesh) granulator discharge (%) | 1.5 |
| Growth rate index (mm/h) | 0.14 +/− 0.04 |
| % of pipe reactor make to ventilation as dust (%) | 0-9 |
| Product pH | 2.0-6.4 |
| Average product hardness (kg) | 4.0 +/− 0.3 |
| Accelerated caking test (pH 4.3 & 3.3 samples) | no caking |
| Critical relative humidity at 30° C. (%): | 75-85 |

Granulation and product results are similar to the aluminum case illustrated in Example 1. Stripped zinc electrolyte is therefore a suitable granulating aid.

Example 4

This example is to illustrate the use of stripped zinc electrolyte as a granulating aid at an above average level of addition to produce a product having 1.3% Zn, 0.16% Mg and 0.09% Mn. Table 5 summarizes the results.

TABLE 5

| | |
|---|---|
| Operating Data | |
| Total water input as percent of granulator feed (%) | 17 |
| Average granulator temperature (°C.) | 85 |
| Average granulator retention time (h) | 0.9 |
| Results | |
| Average moisture in (−6 to +9 mesh) granulator discharge (%) | 2.3 |
| Growth rate index (mm/h) | 0.27 +/− 0.04 |
| % of pipe reactor make to ventilation as dust (%) | 0 |
| Product pH | 2.0-4.5 |
| Average product hardness (kg) | 4.3 +/− 0.3 |
| Accelerated caking test (pH 3.5 sample) | no caking |
| Critical relative humidity at 30° C. (%) | 75-85 |

The use of higher concentrations of stripped zinc electrolyte enhanced the effect of the stripped zinc electrolyte as a granulating aid. The tendency to granulate, as measured by the growth rate index, is greater and there is less material to dust compared to the results in Example 3.

Example 5

This example illustrates the use of stripped zinc electrolyte as a granulating aid at a below average level of addition to produce a product having 0.47% Zn, 0.07% Mg and 0.04% Mn. Table 6 summarizes the results.

TABLE 6

| | |
|---|---|
| Operating Data: | |
| Total water input as percent of granulator feed (%) | 16 |
| Average granulator temperature (°C.) | 79 |
| Average granulator retention time (h) | 0.9 |
| Average moisture in (−6 to +9 mesh) in granulator discharge (%) | 1.4 |
| Growth rate index (mm/h) | 0.15 +/− 0.04 |
| % of pipe reactor make to ventilation as dust (%) | 20 +/− 5 |
| Product pH | 2.6-6.3 |
| Average product hardness (kg) | 3.6 +/− 0.4 |
| Accelerated caking test (for pH 3.7 & 4.0 samples): | no caking |
| Critical relative humidity at 30° C. (%) | 85-95 |

When the lower concentrations of stripped zinc electrolyte are used, the effect of the stripped zinc electrolyte as a granulating aid is less pronounced. The growth rate index is lower as compared to Example 3, but is still effective when compared to no granulation aid (Example 2).

Example 6

This example illustrates the use of zinc sulphate alone as a granulating aid in order to determine the effect of this specific component of the stripped zinc electrolyte. Table 7 summarized the results in the production of a product having 1.2% Zn.

TABLE 7

| Operating Data | |
|---|---|
| Total water input as percent of granulator feed (%) | 24 |
| Average granulator temperature (°C.) | 82 |
| Average granulator retention time (h) | 1.5 |
| Results | |
| Average moisture in (−6 to +9 mesh) in granulator discharge (%) | 2.2 |
| Growth rate index (mm/h) | 0.10 +/− 0.03 |
| % of pipe reactor make to ventilation as dust (%): | not measured |
| Product pH | 2.4–4.6 |
| Average product hardness (kg) | 3.9 +/− 0.5 |
| Accelerated caking test (for pH 3.1 sample) | no caking |
| Critical relative humidity at 30° C. (%) | 75–85 |

Use of zinc sulphate alone resulted in an improvement in growth rate index compared to Example 2.

Example 7

This example illustrates the use of magnesium sulphate as a granulating aid at an elevated concentration, with zinc at a lower concentration, in order to determine the effect of the magnesium component of the stripped zinc electrolyte in the production of a product having 0.5% Mg and 0.4% Zn. Table 8 summarizes the results.

TABLE 8

| Operating Data | |
|---|---|
| Total water input as percent of granulator feed (%) | 20 |
| Average granulator temperature (°C.) | 87 |
| Average granulator retention time (h) | 1.1 |
| Results | |
| Average moisture in (−6 to +9 mesh) granulator discharge (%) | 2.3 |
| Growth rate index (mm/h) | 0.23 +/− 0.04 |
| % of pipe reactor make to ventilation as dust (%): | not measured |
| Product pH | 2.5–3.5 |
| average product hardness (kg) | 4.5 +/− 0.5 |
| Accelerated caking test (for pH 3.4 sample) | no caking |
| Critical relative humidity at 30° C. (%) | 65–75 |

For this concentration of magnesium, good granulation is evidenced by a high growth rate index and the production of granules with pH above 2.5. By comparison with Example 6, it can be seen that zinc at this low concentration would have a minor effect on the granulation, and that the effect is mostly due to the magnesium.

Example 8

This example illustrates that the use of zinc, magnesium and manganous sulphate at low concentrations has little effect on granulation. Although the manganese concentration is low, it is higher than in Examples 3, 4 and 5. Therefore, this example also shows that the manganese in the low concentrations found in stripped zinc electrolyte does little to enhance granule growth. Table 9 summarizes the results for the production of a product having 0.18% Mn, 0.13% Zn and 0.05% Mg.

TABLE 9

| Operating Data | |
|---|---|
| Total water input as percent of granulator feed (%) | 21 |
| Average granulator temperature (°C.) | 84 |
| Average granulator retention time (h) | 1.4 |
| Results | |
| Average moisture in (−6 to +9 mesh) granulator discharge (%) | 0.7 |
| Growth rate index (mm/h) | 0.01 +/− 0.03 |
| % of pipe reactor make to ventilation as dust (%): | not measured |
| Product pH | 2.2–4.0 |
| Average product hardness (kg) | 3.2 +/− 0.4 |
| Accelerated caking test (for ph 3.2 sample): a light set occurred (granules sticking together could be separated by light finger pressure) | |
| Critical relative humidity at 30° C. (%) | 85–95 |

When manganese, zinc and magnesium are used at these low concentrations, granulation is not enhanced compared to the no-additive case (Example 2). While use of higher concentrations of manganese did enhance granulation, plugging of the pipe reactor tended to occur. This presumably occurred because of the drop in solubility of the manganous sulphate as the manganous sulphate solution feed mixed with saturated ammonium sulphate solution in the pipe reactor. (See solubility data "Solubilities of Inorganic and Metal Compounds" 3rd ed A Seidell, Van Nostrand, N.Y., 1940).

Example 9

This example illustrates the use of a synthetic mixture of zinc sulphate, magnesium sulphate and manganous sulphate as a granulating aid. The proportions are approximately those for stripped zinc electrolyte. Table 10 summarizes the results for the production of a product having 0.9% Zn, 0.18% Mg & 0.08% Mn.

TABLE 10

| Operating Data | |
|---|---|
| Total water input as percent of granulator feed (%) | 24 |
| Average granulator temperature (°C.) | 81 |
| Average granulator retention time (h) | 1.4 |
| Results | |
| Average moisture in (−6 to +9 mesh) granulator discharge (%) | 2.3 |
| Growth rate index (mm/h) | 0.17 +/− 0.04 |
| % of pipe reactor make to ventilation as dust (%): | not measured |
| Product pH | 2.8–6.5 |
| Average product hardness (kg) | 4.1 +/− 0.5 |
| Accelerated caking test (for pH 3.6 sample): | no caking |
| Critical relative humidity at 30° C. (%) | 55–65 |

When zinc sulphate, magnesium sulphate and manganous sulphate are used in combination, good granulation is experienced at these concentrations.

Table 11 summarizes the results from the above pilot plant tests for comparison purposes.

TABLE 11

| Ex. | Addition | Growth Rate Index* (mm/h) | Dusting Index** (%) | Hardness Granulation (kg) |
|---|---|---|---|---|
| 1. | aluminum sulphate | 0.14 (4)# | 0–5 | 4.1(5)# base case |
| 2. | no addition | −0.02 (3) | 32 (5) | 3.2(5) unacceptable |
| 3. | SZE*** average level | 0.14 (4) | 0–9 | 4.0(3) good |
| 4. | SZE elevated | 0.27 (4) | 0 | 4.3(3) more pronounced |
| 5. | SZE reduced level | 0.15 (4) | 20 (5) | 3.6(4) good |

TABLE 11-continued

| Ex. | Addition | Growth Rate Index* (mm/h) | Dusting Index** (%) | Hardness Granulation (kg) |
|---|---|---|---|---|
| 6. | zinc sulphate | 0.10 (3) | — | growth rate but high dusting 3.9(5) moderate |
| 7. | High magnesium/zinc sulphates | 0.23 (4) | — | 4.5(5) good |
| 8. | Low conc. manganous zinc & magnesium | 0.01 (3) | — | 3.2(4) ineffective at low conc. used |
| 9. | Zn/Mg/Mn sulphates at SZE proportions | 0.17 (4) | — | 4.1(5) good |

*Growth Rate Index: Average increase in means size divided by average granulator retention time (mm/h)
**Dusting Index: Percent of pipe reactor make to ventilation as dust (%)
***SZE: Stripped Zinc Electrolyte
Numbers in parentheses are the possible error in the last significant digit.

Example 10

The following example serves to illustrate that there is no preferred product pH with respect to product hardness. Granules were produced on the pilot plant scale and samples were collected at various random times and measured for pH and hardness, as shown in Table 12.

TABLE 12

| | Hardness (kg) of 7 mesh granules (Probable maximum errors ±0.5 kg) | pH of a 10% solution |
|---|---|---|
| 0.7% Zn product | 3.7 | 3.3 |
| | 3.3 | 3.3 |
| | 3.8 | 4.4 |
| | 3.6 | 7.3 |
| | 4.2 | 7.4 |
| | 4.5 | 7.0 |
| 1.3% Zn product | 2.5 | 7.7 |
| | 4.2 | 3.1 |
| | 3.9 | 5.2 |
| | 4.0 | 7.5 |
| | 4.4 | 7.5 |
| | 4.3 | 3.5 |
| | 4.1 | 4.5 |

The results show that product hardnesses of higher pH samples were comparable to hardnesses at other pH values. Consequently, pH range is not as restricted as that indicated in the prior art.

Example 11 (Plant Test)

Full scale plant testing was undertaken over several days in order to demonstrate the viability of the present invention, using stripped zinc electrolyte as a granulating aid, on an industrial scale. Temporary plant modifications were undertaken specifically for these test purposes. Prolonged operation at preferred operating conditions was not possible because of equipment limitations. However, the tests did show that product of satisfactory shape and hardness could be produced (e.g. 0.6% Zn, pH 4.7, hardness 5.5 kg). During the tests, daily composite samples showed hardnesses typically in the 4.5–6 kg range where the zinc ranged from 0.4% to 1.2%. Accelerated caking tests on three samples (with pH values 2.6, 4.7 and 4.9) that had pre- viously been cooled and stored in bags for several days, showed virtually no tendency to cake. Any granule clusters were readily separated under light finger pressure.

The product sizing was good for all of the tests and the solids recycled to the granulator contained considerable on-size product (e.g., granulator input 68%+10 mesh, granulator output 84%+10 mesh). Thus, recycles were well under control.

Tests also confirmed that dusting could be controlled.

It will be understood that modifications can be made in the embodiment of the invention illustrated and described herein without departing from the scope and purview of the invention as defined by the appended claims.

We claim:

1. A process for the production of free-flowing, non-caking, stable granular ammonium sulphate containing micronutrients comprising granulating ammonium sulphate in the presence of a granulating aid which is stripped zinc electrolyte containing zinc, magnesium and manganese derived from an electrolytic zinc operation, in an amount effective to produce a final ammonium sulphate product containing about 0.4% to about 1.3% by weight zinc, about 0.01% to about 0.16% by weight magnesium and about 0.01% to about 0.09% by weight manganese.

2. A process as claimed in claim 1, in which the stripped zinc electrolyte typically contains 20–25 g/L zinc, 2–4 g/L magnesium, 1–2 g/L manganese and sulphuric acid.

3. A process as claimed in claim 2, in which the ammonium sulphate is a reaction product of ammonia and sulphuric acid and the stripped zinc electrolyte granulating aid is added during reaction of the ammonia and sulphuric acid.

4. A process as claimed in claim 1, in which the final ammonium sulphate product contains about 0.07% to 0.16% by weight magnesium and about 0.04% to 0.09% by weight manganese.

5. A process as claimed in claim 1, in which the final ammonium sulphate product contains about 0.7% by weight zinc, about 0.09% by weight magnesium and about 0.05% by weight manganese.

6. A free-flowing, non-caking, hard ammonium sulphate fertilizer produced according to the process of claim 1.

7. A free-flowing, non-caking, ammonium sulphate granular fertilizer having a pH of about 2 to 7.5 , when measured on a 10% solution, containing 0.4% to 1.3% by weight zinc, 0.01% to 0.16% by weight magnesium and 0.01% to 0.09% by weight manganese.

8. A free-flowing, non-caking, hard ammonium sulphate granular fertilizer having a pH of about 2 to 7.5, when measured on a 10% solution containing about 0.7% by weight zinc, about 0.09% by weight magnesium and about 0.08% by weight manganese.

* * * * *